Patented Nov. 2, 1926.

1,605,691

UNITED STATES PATENT OFFICE.

GEORGE W. RAIZISS AND ABRAHAM KREMENS, OF PHILADELPHIA, PENNSYLVANIA, ASSIGNORS TO ABBOTT LABORATORIES, OF CHICAGO, ILLINOIS, A CORPORATION OF ILLINOIS.

ARSENO-BISMUTH COMPOUND AND PROCESS OF MAKING SAME.

No Drawing.   Application filed October 15, 1925.   Serial No. 62,631.

Our invention relates to improvements in arseno bismuth compounds and process of making same and its principal object is to produce a body which has therapeutic value in connection with spirochete infections. A further object is to produce a compound which may be used for intravenous and intramuscular injections with a high degree of safety.

In general, these improved products may be formed by treating an amino arsenobenzene with an organic bismuth salt. Salts which we have successfully used in this connection are bismuth tartrates of alkali metals. The products are yellow in color, easily soluble in water giving clear yellow solutions of neutral or slightly alkaline reaction which permits their safe use for intravenous and intramuscular injections without neutralization or further treatment.

Our new products are stable chemical compounds in which the bismuth appears to be firmly attached to the arseno group in the molecular proportion of 3 atoms of arsenic to 2 atoms of bismuth, corresponding to the general formula,

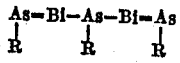

where R is an aromatic nucleus, such as

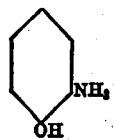

with or without substitution in the amino radical.

In general, these products may be produced by dissolving the amino arsenobenzene in water, to which water solution there is added a water solution of the organic bismuth salt, for example, a tartrate. We prefer to use the tartrate of an alkali metal such as potassium. The solution is then stirred and is filtered into a mixture of absolute methyl alcohol and absolute ether. The new product appears as a yellow precipitate which is filtered off and dried in vacuo.

The following examples illustrate our invention:

Example 1.

5 grams of sodium 3,3'-diamino-4,4'-dihydroxyarsenobenzene-N-methylene-sulfinate are dissolved in 20 c. c. of water and there is then gradually added, with continuous stirring, a solution of 2 grams of potassium bismuth tartrate $(C_4H_2O_9Bi_3K4H_2O)$ in 10 c. c. of water. After about 15 minutes of stirring, the entire liquid is filtered into a mixture of 500 c. c. of absolute methyl alcohol and 500 c. c. of absolute ether. The new product separates as a light, yellow precipitate which is filtered off and dried in vacuo. This compound may be represented by the formula

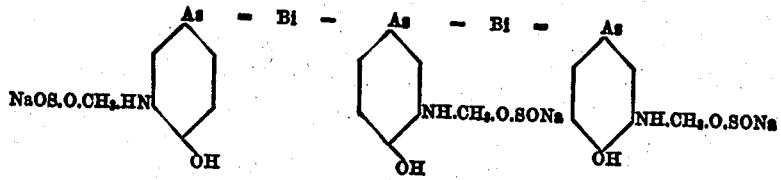

Example 2.

A solution of 5 grams of potassium bismuth tartrate in 25 c. c. of water is slowly added with stirring to a solution of 10 grams of disodium 3,3'-diamino-4,4'-dihydroxyarsenobenzene-N,N'-dimethylene sulfinate in 50 c. c. of water. A yellow precipitate is formed at once. After about 15 minutes of stirring, the precipitate is dissolved by the addition of 2 c. c. of 15% sodium hydroxide solution.

The clear liquid is filtered into a mixture of 300 c. c. absolute methyl alcohol and 500 c. c. absolute ether. The new product separates as a light yellow precipitate. It is filtered off and dried in vacuo. This compound may be represented by the formula

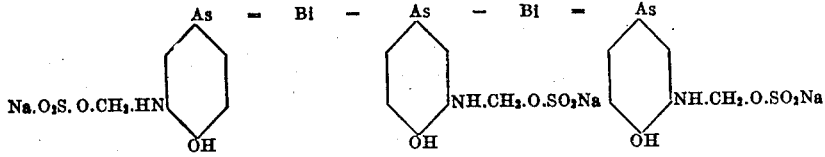

Example 3.

5 grams of 3,3'-diamino-4,4'-dihydroxyarsenobenzene dihydrochloride are dissolved in 100 c. c. of water and converted into the disodium salt by adding the required amount of sodium hydroxide solution. There is then added to it a solution of 3.5 grams of potassium bismuth tartrate in 10 c. c. of water. After about 15 minutes of stirring, the entire liquid is filtered into a mixture of 300 c. c. absolute methyl alcohol and 500 c. c. of absolute ether. The new product separates as a yellow precipitate. It is filtered off and dried in vacuo.

The scope of the invention should be determined by reference to the appended claims, said claims being construed as broadly as possible, consistent with the state of the art.

We claim as our invention:

1. As a new compound of value in the treatment of spirochete infections, an amino arsenobenzene combined with an organic bismuth salt.

2. As a new article of manufacture, amino arsenobenzene combined with a bismuth tartrate of an alkali metal.

3. As a new article of manufacture, an amino arsenobenzene combined with an organic bismuth salt in molecular proportions of 3 atoms of arsenic to 2 atoms of bismuth.

4. As a new article of manufacture, an amino arsenobenzene combined with a bismuth tartrate of an alkali metal in molecular proportions of 3 atoms of arsenic to 2 atoms of bismuth.

5. As a new article of manufacture, suitable for use in spirochete infections, an amino arsenobenzene combined with potassium bismuth tartrate in molecular proportions of 3 atoms of arsenic to 2 atoms of bismuth.

6. The improvement in the process of making an arseno-bismuth compound which consists in dissolving an amino arsenobenzene in water, adding thereto a water solution of an organic bismuth salt, then precipitating the product resulting from the reaction.

7. The improved method of making an arseno-bismuth compound which consists in dissolving an amino arsenobenzene in water, adding to such solution a water solution of a bismuth tartrate of an alkali metal, filtering into a liquid which will precipitate the product, then removing the precipitate.

GEORGE W. RAIZISS.
ABRAHAM KREMENS.